United States Patent

Kirk

[11] Patent Number: 5,860,760
[45] Date of Patent: *Jan. 19, 1999

[54] GRIPPING DEVICE

[75] Inventor: Ian Alastair Kirk, Aberdeen, United Kingdom

[73] Assignee: Downhole Products plc, Aberdeen, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 776,918
[22] PCT Filed: Aug. 10, 1995
[86] PCT No.: PCT/GB95/01890
§ 371 Date: Feb. 11, 1997
§ 102(e) Date: Feb. 11, 1997
[87] PCT Pub. No.: WO96/05439
PCT Pub. Date: Feb. 22, 1996

[30] Foreign Application Priority Data

Aug. 12, 1994 [GB] United Kingdom ................ 9416298

[51] Int. Cl.⁶ .................................................. B25G 3/20
[52] U.S. Cl. ........................... 403/371; 403/11; 403/362; 403/374; 285/23; 248/230.1
[58] Field of Search ............................ 285/23, 321, 421, 285/144, 323; 248/230.1, 219.3, 125.1; 403/371, 372, 367, 365, 313, 310, 311, 309, 373, 374, 11, 12, 362

[56] References Cited

U.S. PATENT DOCUMENTS

| | | |
|---|---|---|
| 1,377,101 | 5/1921 | Sparling ................................. 403/313 |
| 2,455,525 | 12/1948 | Schulz . |
| 2,496,402 | 2/1950 | McVeigh et al. ................... 285/323 X |
| 2,819,099 | 1/1958 | Rittle ................................. 285/323 X |
| 3,049,775 | 8/1962 | Ondeck ................................. 403/365 |
| 3,284,114 | 11/1966 | McCord, Jr. et al. . |
| 3,458,234 | 7/1969 | Bates ................................ 248/125.1 X |
| 3,563,575 | 2/1971 | Sanford ................................. 285/323 |
| 3,742,562 | 7/1973 | Haby . |
| 4,138,145 | 2/1979 | Lawrence ........................... 285/323 X |
| 4,494,778 | 1/1985 | Johnson . |

FOREIGN PATENT DOCUMENTS

| | | |
|---|---|---|
| OE 340 208 | 12/1977 | Australia . |
| 41614/85 | 10/1986 | Australia . |
| 0134448 | 3/1985 | European Pat. Off. . |
| 0 449 194 | 10/1991 | European Pat. Off. . |
| 1 279 647 | 12/1960 | France . |
| 2 488 057 | 2/1982 | France . |
| 0425377 | 5/1967 | Switzerland ........................... 285/323 |
| 2211542 | 7/1989 | United Kingdom . |

Primary Examiner—Brian K. Green
Assistant Examiner—William L. Miller
Attorney, Agent, or Firm—Ratner & Prestia

[57] ABSTRACT

A gripping device (10) is described which has an inner member (14) and an outer member (12). The inner member has a split (20) which define a first end (6) and a second end (8). A selectively operable device (18) is also included to keep the first and second ends (6, 8) apart to permit the device (10) to be placed around an object (30) and to permit the first and second ends (6, 8) to move towards each other so that the inner member (14) grips the object (30). At least part of an outer face (26) of the inner member (14) interfits with at least a part of an inner face (22) of the outer member (12) in a manner such that when a load is applied to the outer member (12), the inner face (22) of the outer member (12) acts upon the inner member (14) to cause compression of the inner member (14) thereby increasing the grip of the inner member (14) on the object (30). The device (10) is then locked in position on the object (30) and when the load is removed the action of the outer member (12) on the inner member (14) is reduced thereby decreasing the grip of the inner member (14) on the object (30) and unlocking the device (10) from the object (30).

9 Claims, 3 Drawing Sheets

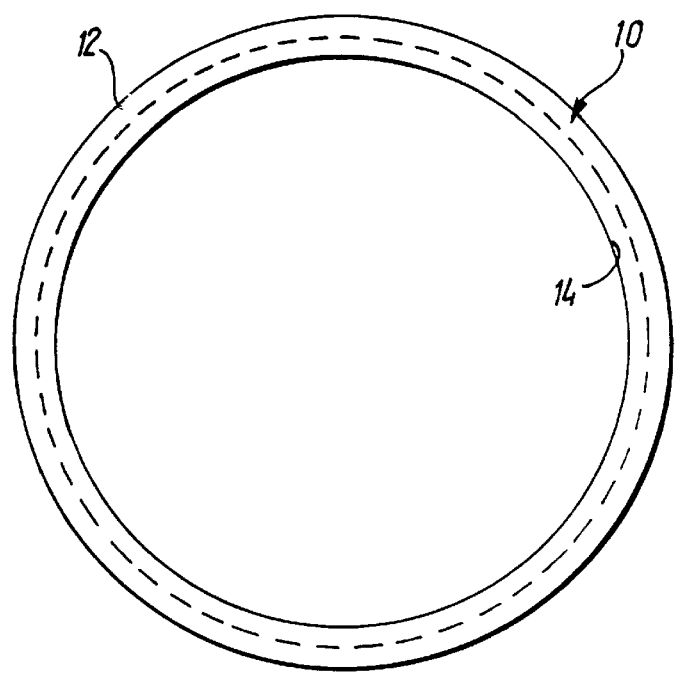
FIG. 1
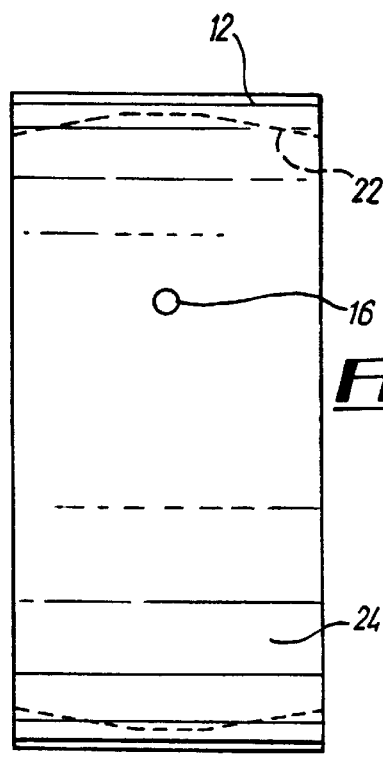
FIG. 2
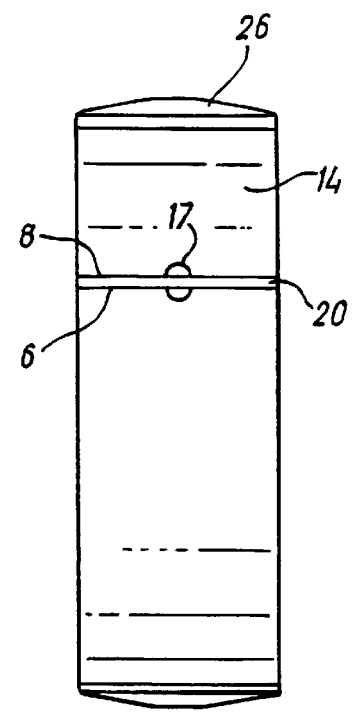
FIG. 3

GRIPPING DEVICE

BACKGROUND OF THE INVENTION

This invention relates to a gripping device.

Clamping devices have been used to secure other devices to pipes or tubes. As an alternative to this a ring with screws has also been used. However, the screws of these rings can damage the pipe or tube to which the device is attached. These clamping or ring devices have a particular application in the oil industry for oilwell tubes and drill pipes.

SUMMARY OF THE INVENTION

According to the present invention there is provided a gripping device having an inner and an outer member, the inner member having a split defining a first and a second end and a selectively operable device to keep said first and second ends apart to allow the device to be placed round an object and to allow the first and second ends to move towards one another so that the inner member grips the object, and in which at least a part of an outer face of the inner member interfits with at least a part of an inner face of the outer member in a manner that when a load is applied to the outer member the inner face of the outer member acts upon the inner member to cause compression of the inner member thereby increasing the grip of the inner member on the object and locking the device in position on the object, and when the load is removed the action of the outer member on the inner member is reduced thereby decreasing the grip of the inner member on the object and unlocking the device on the object.

Preferably, the inner member is a split ring biased so that the ends of the split ring tend towards one another.

Preferably, the selectively operable device comprises a wedging device.

Preferably, the wedging device is a screw within a screw thread, the screw thread being in transverse disposition within the slit. The screw may be accessed from an outer face of the outer member to allow the screw to be removed or placed in the device.

Alternatively, the selectively operable device may be a fastening means such as a jubilee type-clip positioned around the inner member.

Typically, the device may further include an initiation device which biases the inner face of the inner member against the object to help initiate the grip of the device on the object. The initiation device may be provided by a spring loaded clip which at least partially encircles the outer surface of the inner member. Alternatively, the initiation device may be provided a locking mechanism, such as a cable tie, which encircles the outer surface of the inner member and may be tightened to initiate the gripping of the device.

In a further alternative embodiment the selectively operable device may be cooperating eccentric formations on the inside of the outer member and the outside of the inner member which cooperate with each other typically, when the outer member is rotated relative to the inner member.

In one example of the invention the device may be in the form of a ring which is slid over the object.

Preferably, the inner member is a single part.

Alternatively, the inner member may be in two or more parts, to allow the inner member to be placed around the object. The outer member may also be in two or more parts to allow the outer member to be placed round the object with the inner member. The two or more parts may be connected by any suitable means such as pins and/or may be hinged.

Preferably, the outer face of the inner member has at least one taper interfitting with an accommodating recess in the inner face of the outer member. This arrangement may allow locking of the device on the object in the direction of the applied load. Alternatively, this arrangement may be such that the device is lockable to the object in one direction and is moveable in an opposite direction.

Preferably, the outer member is a ring shape.

Preferably, the object is a pipe or tube.

Preferably, an inner face of the inner member has a friction surface facilitating the gripping action when the wedging means is removed.

Preferably, the outer face of the outer member is suitably formed to permit flow of any material past the device. This may be by providing flutes or spirals in the outer face of the outer member.

Examples of a gripping device in accordance with the invention will now be described with reference to the accompanying drawings.

BRIEF DESCRIPTION OF THE DRAWINGS

FIG. 1 is a plan view of a first example of a gripping device;

FIG. 2 is an end view of an outer member of the gripping device of FIG. 1;

FIG. 3 is a section through an inner member of the device shown in FIGS. 1 and 2;

DESCRIPTION OF THE PREFERRED EMBODIMENT

Figure 4:
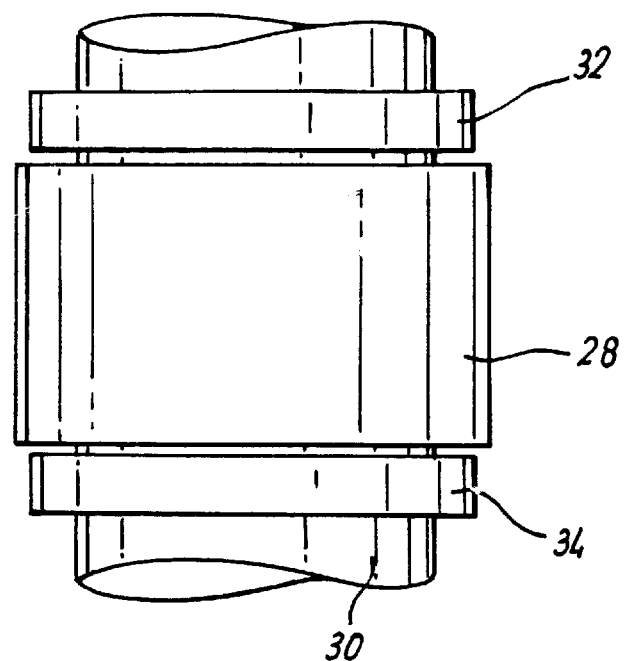
FIG. 4 shows an example, in use, of the device shown in FIG. 1.

FIGS. 1 to 4 show a gripping device generally indicated by reference 10 which has an outer member 12 and an inner member 14.

The outer member 12 is of a ring shape and has a recess 22 formed within the inner face of the outer member 12. The recess 22 has inwardly sloping side walls. A screw thread 16 is provided on an outer face 24 of the outer member 12. The screw thread 16 provides an opening for a screw 18 (FIG. 3) to be placed within the outer face of the outer member 12.

The inner member 14 is a split ring with ends 6 and 8 and fits within the outer member 12. The inner member 14 has a double tapered outer face 26 and this allows the outer face 26 to interfit within the recess 22 of the outer member 12. A screw thread 17 is provided within the split 20 of the inner member 14 and the screw thread 17 is disposed transversely within the split 20.

When the inner member 14 is placed within the outer member 12, the screw thread 17 of the inner member 14 is aligned with the screw thread 16 of the outer member 12. The screw 18 is then placed within the device 10 through the screw threads 16 and 17. In this position the screw 18 acts as a wedge to keep the ends 6 and 8 of the inner member 14 apart. This enables the device 10 to be placed round an object such as a pipe or tube and when the device 10 is in a desired position on the pipe or tube the screw 18 is removed to allow the ends 6 and 8 of the inner member 14 to move towards one another to cause the inner member 14 to grip the pipe or tube so that the device 10 remains in the desired position on the pipe or tube.

When a load is applied to an upper or lower edge of the outer member 12 the shape of the recess 22 causes the outer member 12 to partially move over the tapered outer face 26 of the inner member 14 thereby compressing the inner member against the pipe or tube by causing the ends 6 and 8 of the inner member 14 to move further towards one another. Further movement of the outer member 12 is prevented due to the shape of the recess 22 and the interfitting outer face 26 of the inner member 14 causing compression of the inner member 14 against the pipe or tube. This causes the device 10 to lock in position on the pipe or tube.

When the load is removed the compression of the inner member 14 against the pipe or tube is reduced so that the inner member 14 grips the pipe or tube but the device 10 is not locked in position on the pipe or tube.

The device 10 may be used as shown in FIG. 4 where a load 28 is held in position on a pipe 30 between two gripping devices 32 and 34 each of the type described above. Any upward or downward force applied to the device 32 or 34 locks the device 32 or 34 in position on the pipe and the load 28 remains in position on the pipe.

Figure 5:
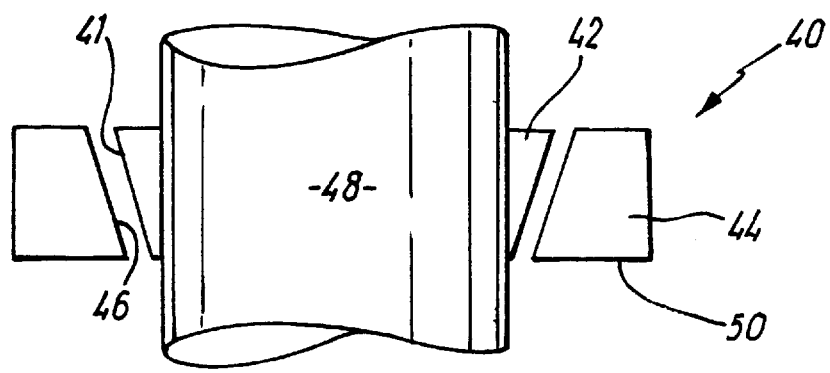
FIG. 5 shows a second example of a gripping device.

An alternative embodiment is shown in FIG. 5 where a gripping device 40 has a split ring inner member 42 and a ring shape outer member 44. The outer face 41 of the inner member 42 has a single taper cooperating with an inner face 46 of the outer member 44. This arrangement allows the device 40 to be locked in position on the pipe 48 when a load is applied in one direction only, in this embodiment the device 40 is locked in position when a load is applied to a lower edge 50 of the outer member 44 (ie when an upward face is applied).

Figure 6:
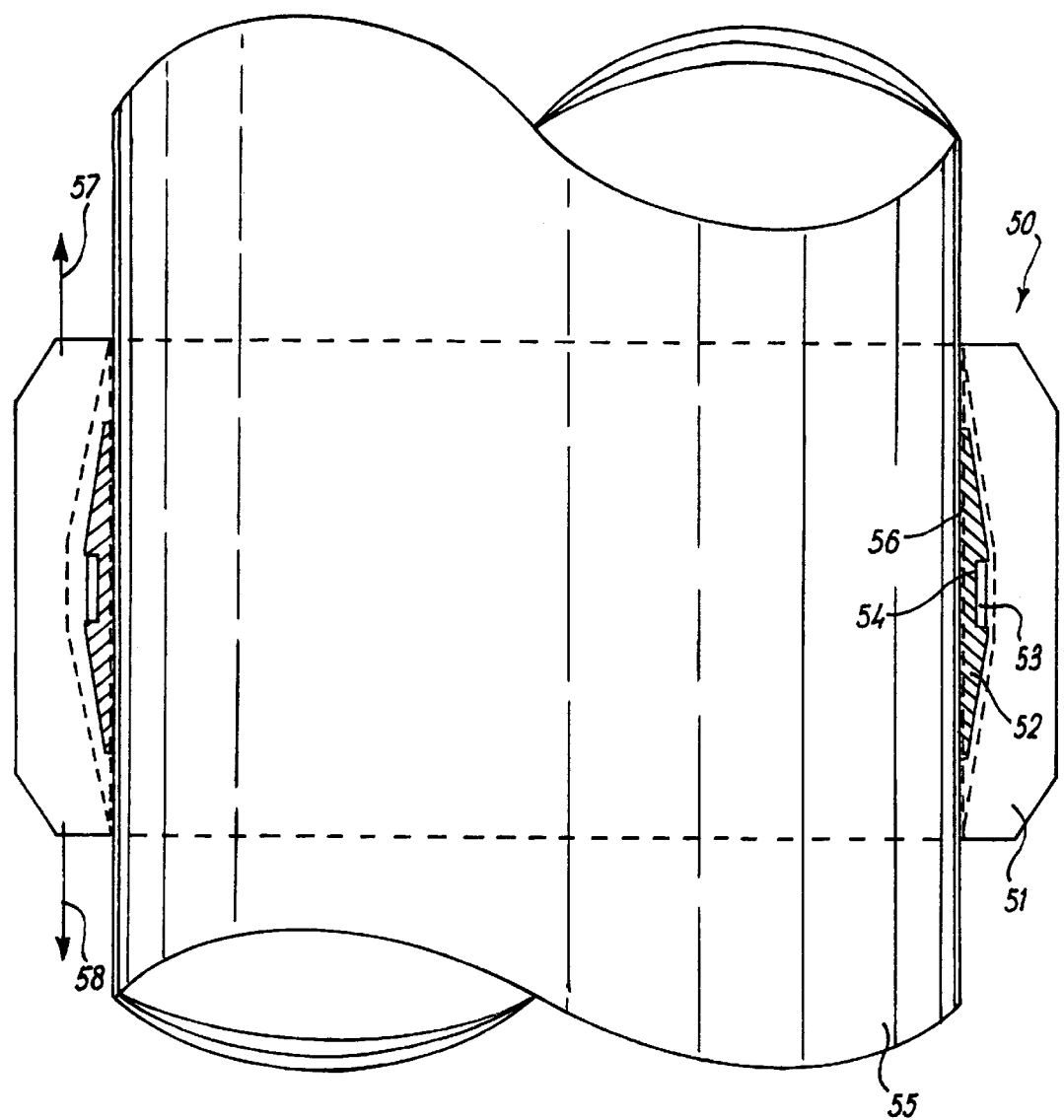
FIG. 6 is a cross-sectional view through a third example of a gripping device.

FIG. 6 shows a third example of a gripping device 50 in use. The gripping device 50 comprises an outer member 51, an inner member 52 and a spring clip 53 located in a recess 54 in the radially outer surface of the spring clip 53. As shown in FIG. 6, the device 50 is mounted on the outside of a tubular pipe 55. The device 50 operates in a similar manner to the device 10 shown in FIGS. 1 to 4.

However, the device 50 also includes a spring clip 53 which biases inner surface 56 of the inner member 52 into contact with the outside surface of the tubular 55. This biasing action helps to increase the initial gripping force of the inner member 52 on the tubular 55 and helps to initiate the gripping action of the device 50 so that when a force in the direction of either of arrows 57 or 58 is applied to the outer member 51 of the device 50 movement of inner ring 52 in the corresponding direction of the arrows 57, 58 is minimised or prevented by the biasing action of the spring clip 53 forcing the inner surface 56 within the inner member 52 against the surface of the tubular 55 and the tapered faces of the inner and outer members cooperating to force the inner member to grip the tubular 55. This initial gripping action may be further improved by the provision of a friction coating on the surface 56.

The advantages of a gripping device according to the invention are that no screws contact the object itself, thereby reducing possible damage to the object. The gripping device can be selected to allow movement of a device held between at least two gripping devices when a force is applied in one direction or to allow no movement of the device due to the locking of the gripping and locking device in both directions of the applied force.

Modifications and improvements may be incorporated without departing from the scope of the invention.

We claim:

1. A gripping device having an inner and an outer member, the inner member having a split defining a first and a second end, and a selectively operable device comprising a spacer, wherein in a first configuration of the selectively operable device, the spacer is located between the ends of the inner member to keep said first and second ends apart and to allow the device to be placed around an object and wherein, in a second configuration, the spacer is removed from between the ends of the inner member to allow the first and second ends to move towards one another in a gripping motion, and in which at least a part of an outer face of the inner member interfits with at least a part of an inner face of the outer member in a manner that when a load is applied to the outer member the inner face of the outer member acts upon the inner member to cause compression of the inner member thereby increasing the grip of the device and locking the device in position, and when the load is removed the action of the outer member on the inner member is reduced thereby decreasing the grip of the device.

2. A gripping device according to claim 1, wherein the inner member is a split ring having the ends biassed towards each other.

3. A gripping device according to claim 1, wherein the selectively operable device comprises a wedging device.

4. A gripping device according to claim 3, wherein the wedging device comprises a screw threaded member.

5. A gripping device according to claim 1, wherein the device further includes a spring loaded clip disposed between the two members to bias an inner face of the inner member inwardly to help initiate gripping of the device.

6. A gripping device according to claim 5, wherein the spring loaded clip at least partially encircles the outer face of the inner member.

7. A gripping device according to claim 1, wherein a friction coating is provided an inner face of the inner member.

8. A gripping device according to claim 1, wherein the inner member has a tapered portion on the outer face which co-operates with a corresponding tapered portion on the inner face of the outer member.

9. A gripping device according to claim 7, wherein the outer face of the inner member has two tapered portions which taper in opposite directions and co-operate with corresponding tapered portions on the inner face of the outer member.

\* \* \* \* \*